SUPPRESSION OF STRONG INTERFERING SIGNALS IN A RADIO RECEIVER
Filed June 16, 1967 3 Sheets-Sheet 1

INVENTOR.
GINO J. COVIELLO
BY
Stanley M. Schwarz
ATTORNEY

Nov. 11, 1969 G. J. COVIELLO 3,478,268

SUPPRESSION OF STRONG INTERFERING SIGNALS IN A RADIO RECEIVER

Filed June 16, 1967 3 Sheets-Sheet 2

INVENTOR.
GINO J. COVIELLO

BY

Stanley M. Schwarz

ATTORNEY

INVENTOR.
GINO J. COVIELLO
BY
[signature]
ATTORNEY

United States Patent Office 3,478,268

Patented Nov. 11, 1969

3,478,268
SUPPRESSION OF STRONG INTERFERING SIGNALS IN A RADIO RECEIVER

Gino J. Coviello, Buffalo, N.Y., assignor to Sylvania Electric Products Inc., a corporation of Delaware Filed June 16, 1967, Ser. No. 646,572
Int. Cl. H04b *1/10*
U.S. Cl. 325—65 16 Claims

ABSTRACT OF THE DISCLOSURE

A nonlinear signal processing circuit, especially useful in the receiver of a quaternary phased spread spectrum communication system, for suppressing interfering signals that are stronger than the desired signal and which have waveform envelopes that are relatively constant. The nonlinear processor includes an envelope detector and averager for deriving, from the combined interfering and desired signal input, a control voltage which approximates the amplitude of the interfering signal, a gain adjusting circuit operative in response to the composite received signal and the control voltage to generate a close approximation of the interfering signal waveform, and a difference amplifier in which this approximation of the interfering waveform is subtracted from the composite received waveform to achieve cancellation of the interfering signal. The receiver further includes a decision circuit for bypassing the nonlinear processor when the desired signal is stronger than the interfering signals.

BACKGROUND OF THE INVENTION

This invention relates to radio communication systems, and more particularly, to means for suppressing strong interfering signals in favor of a desired signal by use of nonlinear processing in the receiver, especially in combination with spread spectrum techniques.

An important consideration in the design of sophisticated radio communication systems is the provision of suitable means for overcoming the problem of strong in-band interference at the receiver. Two approaches which have been employed to suppress the effects of such interference upon reception are nonlinear adaptive processing and spread spectrum techniques. Typical of the first approach are the "feedforward across a limiter" and "dynamic trapping" techniques described by Elie J. Baghdady in "New Developments in FM Reception and Their Application to the Realization of a System of 'Power Division' Multiplexing," IRE Transactions on Communications Systems, September 1959, pp. 147–161. Although providing significant strong signal suppression capabilities, both of these nonlinear techniques have certain limitations that restrict their usefulness. The "feedforward" technique loses its effectiveness as the instantaneous frequency difference between the desired and interfering signal becomes less than half the bandwidth of the desired signal, while the "dynamic trap" becomes ineffective as the rate of frequency change of the interfering signal causes its spectrum to cover a significant portion of the band of the desired signal.

The use of spread spectrum techniques represents a more sophisticated approach in that protection is achieved against a much broader class of interfering waveforms (see "A Discussion of Spread Spectrum Composite Codes" by D. J. Braverman, dated Dec. 1, 1963, and available from the Defense Documentation Center as AD No. 425862). By this approach, the information-bearing signal is mixed with a psuedo noise-like waveform prior to transmission to thereby widen the specrum of the transmitted signal energy. At the receiver, this wide-band signal is correlated with a replica of the noise-like waveform to collapse the signal into its original information bandwidth. In general, the net signal-to-interference ratio improvement provided by this technique is equivalent to the ratio between the transmitted and information bandwidths. As an example, an expansion of 1000 to 1 in bandwidth (30 db) would provide a signal-to-interference ratio ($S/I$) improvement after correlation which is approximately 30 db higher than the incoming $S/I$ ratio received at the antenna.

SUMMARY OF THE INVENTION

The present invention provides a nonlinear processor which is not constrained by the aforementioned limitations of prior art nonlinear techniques and which significantly enhances the interference protection provided by a spread spectrum system when used in conjunction with quaternary phased spread spectrum modulation. This nonlinear processor is connected at the front end of a radio receiver, ahead of any correlation or detection circuits, and is operative upon reception of a composite signal consisting of a desired signal and a stronger interfering signal to substantially suppress the interfering signal in favor of the desired signal. To avoid cancellation of the desired signal when it is stronger than the interference signal, the receiver further includes a decision circuit for bypassing the nonlinear processor in the presence of such input conditions.

Briefly, the nonlinear processing circuit according to the invention comprises an envelope detector and averager for deriving from the received composite signal a control voltage which approximates the amplitude of the interfering signal, a gain adjusting circuit for controlling the amplitude of the composite received signal in response to this control voltage so as to generate a waveform which closely approximates the interfering signal waveform, and a difference amplifier for subtracting this approximation of the interfering waveform from the composite received signal. The resulting output of the difference amplifier consists of the desired signal with the interfering signal substantially suppressed. In a spread spectrum receiver, this output is coupled to the input of the correlator.

In a preferred embodiment of the invention, the gain adjusting circuit comprises a limiter and bandpass filter, through which the composite received signal is processed to remove amplitude variations while retaining phase information, and a variable gain amplifier having a signal input to which this amplitude limited signal is applied, a gain control input which is coupled to the output of the averager and an output terminal which is connected to an input of the difference amplifier. In an alternate embodiment of the gain adjusting circuit, the composite received signal is applied directly to the signal input of the variable gain amplifier, and the gain control signal for the amplifier is obtained from a divider to which the outputs of both the envelope detector and averager are applied.

When used in a quaternary phased spread spectrum communication system, the nonlinear processor is capable of providing as much as an additional 40 db of interference suppression in a spread spectrum correlation receiver, without requiring further expansion of bandwidth. Optimal operation is achieved in the presence of interfering waveforms which have an envelope that is constant or slowly varying with time, which include all varieties of frequency and phase modulated waveforms. In contrast with the prior art, the present technique remains effective when the interference spectrum coincides with the desired signal carrier.

BRIEF DESCRIPTION OF THE DRAWINGS

This invention will be more fully described hereinafter in conjunction with the accompanying drawings, in which.

DETAILED DESCRIPTION OF THE INVENTION

Figures 1, 2:
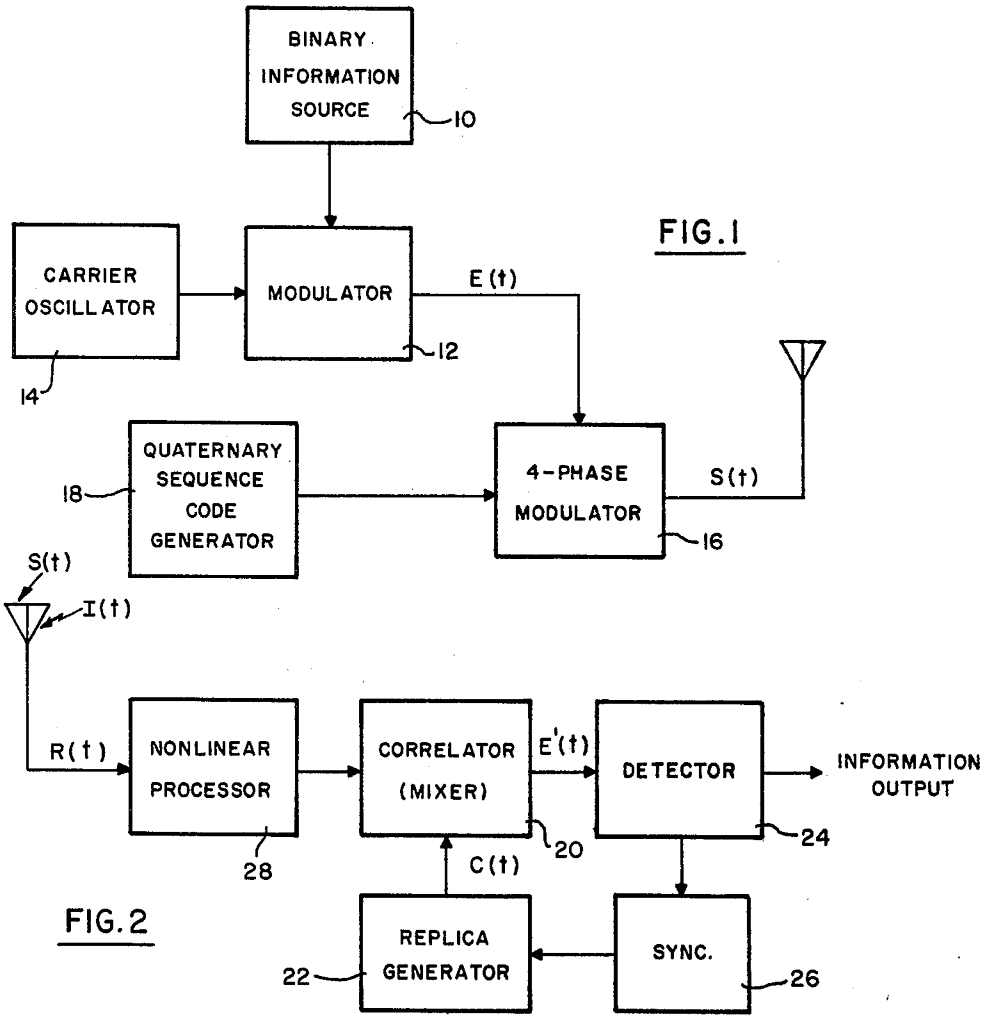
FIG. 1 is a block diagram of a transmitter including modulation means for producing a quaternary phased spread spectrum signal.
FIG. 2 is a block diagram of a correlation receiver associated with the transmitter of FIG. 1 and including a nonlinear processor in accordance with the invention.

A preferred application of the interference suppression techniques of the invention is illustrated in FIGS. 1 and 2, which are simplified block diagrams of the transmitter and receiver, respectively, of a quaternary phase spread spectrum communication system. In the transmitter (FIG. 1) binary information from a source 10 is applied to a modulator 12 to phase modualte a carrier frequency applied thereto from oscillator 14. The resulting output is:

$$E(t)=A\cos(w_s t+\theta) \quad (1)$$

where $\theta$ is either 0 or $\pi$, corresponding to the binary states "zero" or "one." It will be assumed that the information is supplied at $1/T$ bits per second, where T equals the duration of one information bit. The waveform $E(t)$ represents the information-bearing signal and is applied to a 4-phase modulator 16 to be further modulated by the output of a quaternary sequence code generator 18 to produce the desired quaternary phased spread spectrum signal for transmission, which may be expressed as:

$$S(t)=A\cos(w_s t+\theta+b\pi/2) \quad (2)$$

The value of $b$ can have one of four possible values, 0, 1, 2, or 3, determined by the code generator 18 in a pseudo-random manner. Methods of generating such codes are well known in the art; e.g., see the Braverman report, supra, relative to binary sequences, and for the general case of quaternary maximum length sequences, see the text by W. W. Peterson entitled "Error-Correcting Codes," MIT Press and John Wiley and Sons Inc., pp. 147–148. Method of implementing the 4-phase modulator may be chosen from several known techniques; e.g., modulator 16 may comprise a delay line circuit having four output taps selectively controlled by the four output states of code generator 18 to produce phase delays of 0, $\pi/2$, $\pi$, or $3\pi/2$. The rate at which the phase states (values of $b$) are supplied is defined as W per second. The bandwidth of the transmitted signal $S(t)$, therefore, is proportional to W, and it can be shown that the ratio of the transmitted bandwidth to the information bandwidth is given by $$\text{Band-spread ratio}=\frac{W}{1/T}=TW \quad (3)$$

Referring now o FIG. 2, the correlation receiver associated with the spread spectrum transmitter of FIG. 1 is shown as comprising: a correlation mixer 20, also referred to as a correlator; a replica generator 22 which is identical to code generator 18 and provides one input to the correlation mixer; a detector 24 for integrating the output of the correlation mixer to provide the information output signal; and, a synchronizer 26 coupled between detector 24 and generator 22 for aligning the replica generator code stream with the received coded signal. If the received spread spectrum signal $S(t)$ were applied directly to the input of the correlator, the above-described transmitter and receiver would comprise a conventional spread spectrum communication system similar to that described in some detail in the Braverman report, supra. In the improved system, however, a nonlinear processor 28 in accordance with the invention is connected ahead of the correlator 20, as shown, to provide a significant improvement in interference suppression.

Before covering the detailed construction and operation of the nonlinear processor, the operation of the correlation receiver will be briefly described, assuming $S(t)$ is applied directly to correlator 20. Replica generator 22 produces a quaternary phased waveform which may be expressed as:

$$C(t)=\cos(w_c t+b\pi/2) \quad (4)$$

Mixing $S(t)$ and $C(t)$ and filtering out the high frequency component results in:

$$E'(t)=A/2\cos[(w_s-w_c)t+\theta] \quad (5)$$

Thus, it is seen that the wide-band signal $S(t)$ is compressed into the original information bandwidth, $1/T$.

Although the correlator functions to recover the narrow band information from the spread spectrum signal, just the opposite effect is achieved against a received interfering signal waveform. Since such a waveform is not correlated with the local code stream produced by generator 22, a band spreading effect takes place. Even with continuous wave interference, the action of mixing with $C(t)$ spreads the interference energy over an effective bandwidth W. Thus, if the bandwidth of detector 24 is $1/T$, almost all of the desired signal energy will be utilized, but only $1/TW$ of the interfering signal energy will be accepted. As a first order approximation it may be stated that:

$$(S/I)_d=(S/I)_a+TW \quad (6)$$

where $(S/I)_d$=the signal-to-interference ratio at the detector, and
$(S/I)_a$=the signal-to-interference ratio at the antenna.

This shows that, ideally, an improvement in $S/I$ is achievable in direct proportion to the band-spread ratio, TW.

The interference suppression thus afforded by the spread spectrum technique is achieved against virtually all possible interference waveforms, both narrow and wideband. By inserting the nonlinear processor 28 prior to the spread spectrum correlator, however, a substantial increase in the interference suppression capability of the system is provided against a specific class of interfering signal waveforms, namely, all those which have relatively constant or slowly varying envelopes. In general, this includes such common forms as: continuous wave, frequency modulated, frequency shift keyed, and phase shift keyed. Such a class of interfering waveforms can be represented by:

$$I(t)=B\cos(w_i t+\phi(t)) \quad (7)$$

where $\phi(t)$ is a general phase term (i.e., it can be constant, swept, random variable, etc.) and $w_i$ can be equal to or different than $w_s$. Further, as will be made clear, the subject nonlinear processor is operative to "cancel" the stronger of the constituent input signals; hence, it is useful only when the received interfering signal is stronger than the desired signal.

Figure 3:
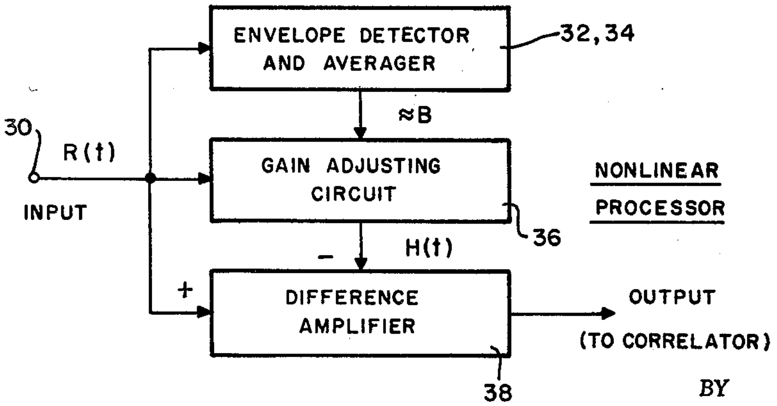
FIG. 3 is a simplified block diagram of a nonlinear processor in accordance with the invention.

A simplified block diagram of nonlinear processor 28, according to the invention, is shown in FIG. 3. Using Equations 2 and 7, the composite received signal applied to the input of the nonlinear processor, denoted as terminal 30, may be expressed as:

$$R(t)=S(t)+I(t) \quad (8)$$
$$=A\cos(w_s t+\theta+b\pi/2)+B\cos[w_1 t+\phi(t)]$$

where it is assumed that: both A and B, the amplitudes of the desired and interfering signals, respectively, are constant or slowly varying with time; $B\gg A$; and, both the envelope and phase of R($t$) are time varying.

The operational function of the processor is to generate a waveform which is an approximation of the interfering signal I($t$), and to subtract this approximation from the composite received signal R($t$) so as to effectively cancel the interfering signal. Since we assume that the interfering signal I($t$) is much stronger than the desired signal S($t$), the phase of R($t$) is already a close approximation to the phase of I($t$). The envelope of R($t$) will vary with time, having the following amplitudes under the specified conditions:

env R($t$)$=B+A$ when I($t$) and S($t$) are in phase
$=B-A$ when I($t$) and S($t$) are out of phase
$\approx B$ when I($t$) and S($t$) are in phase quadrature Now, if the phase of S($t$) is rapidly varying, it is assured that the phase relationship between S($t$) and I($t$) will be rapidly varying; hence, env R($t$) will also vary rapidly between the values $B\pm A$.

In order to achieve the desired functional objectives in view of the above-discussed signal conditions, the processor, as illustrated in FIG. 3, basically comprises an envelope detector and averager 32, 34, a gain adjusting circuit 36, and a difference amplifier 38. The composite received signal R($t$) is applied, via terminal 30, in parallel to the inputs of these three component circuits. The envelope detector and averager derive from R($t$) a control voltage which is the average of the envelope fluctuations of R($t$) and a very close approximation to the value of B, the interfering signal amplitude. This control voltage is applied to circuit 36 to adjust the amplitude of R($t$) to agree with the approximation of B and thereby generate an output waveform H($t$) which is an approximation to the interfering signal I($t$). H($t$) is then subtracted from R($t$) in difference amplifier 38 to produce an output signal from the processor in which I($t$) has been substantially suppressed. This output of difference amplifier 38 is coupled to correlator 20 in the receiver of FIG. 2 for a further improvement in $S/I$ of approximately TW (db), as discussed above.

Figure 4:
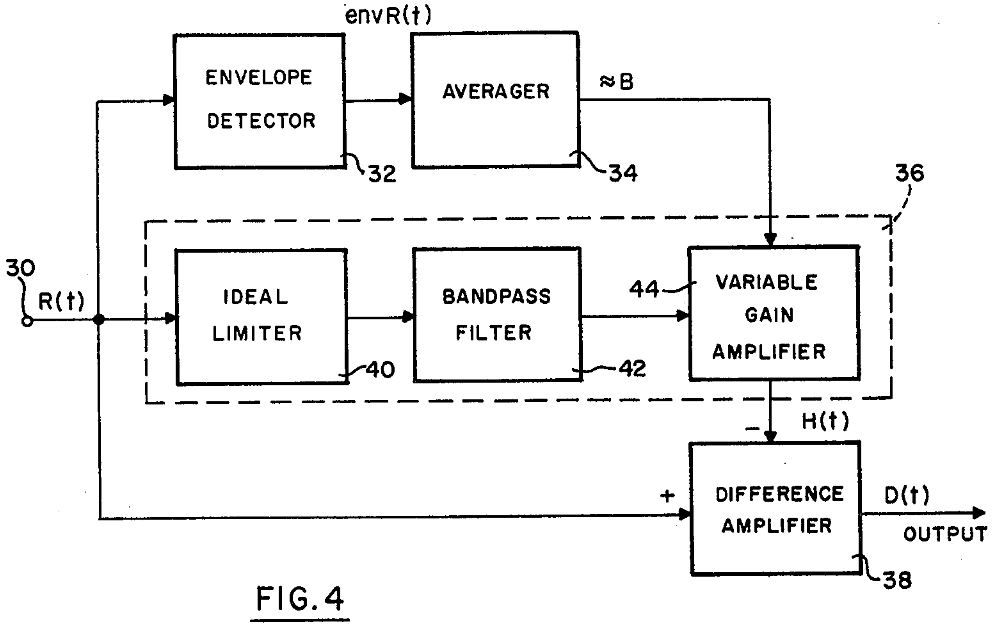
FIG. 4 is a block diagram of a preferred embodiment of a nonlinear processor in accordance with the invention.

A preferred embodiment of the nonlinear processor in accordance with the invention is shown in FIG. 4, in which the gain adjusting circuit is illustrated as comprising an ideal limiter 40, a bandpass filter 42 and a variable gain amplifier 44, with limiter 40 and filter 42 being serially connected between input terminal 30 and the signal input of amplifier 44. The gain control input of amplifier 44 is connected to the output of averager 34, envelope detector 32 being connected between input terminal 30 and the input of the averager. H($t$), the approximation of the interfering signal waveform, is available at the output of amplifier 44, which is connected to one input of difference amplifier 38. The second input of amplifier 38 is connected to terminal 30.

The composite received signal R($t$), expressed in Equation 8, can also be described in terms of its envelope and phase as:

$$R(t)=\text{env }R(t)\cdot\cos[\arg R(t)] \quad (9)$$

where:

$$\text{env }R(t)=[A^2+B^2+2AB\cos[(w_s-w_1)t+b\pi/2+\theta-\phi(t)]]^{1/2} \quad (10)$$

and:

$$\text{avg }R(t)=\tan^{-1}\left[\frac{B\sin[w_i t+\phi(t)]+A\sin[w_s t+b\frac{\pi}{2}+\theta]}{B\cos[w_i t+\phi(t)]+A\cos[w_s t+b\frac{\pi}{2}+\theta]}\right] \quad (11)$$

The function of envelope detector 32 is to move the composite radio frequency carrier and to generate a direct current voltage which is proportional to the envelope of R($t$). This voltage, denoted env R($t$), consists of constant and fluctuating components. The constant component primarily represents the value which is derived from the terms $A^2+B^2$. The fluctuating component is an oscillating one due to the cosine term and can never remain stationary since:

(a) The terms, $(w_s-w_1)t-\phi(t)$, represent the instantaneous phase difference between the signal's carrier and the interfering signal waveform. This phase would normally be expected to change continually at a rate proportional to the instantaneous frequency difference.

(b) Even if the above frequency difference is zero, or very small, the action of the spread spectrum modulation will still cause discrete phase jumps, in increments of 90°, at the quaternary sequence code rate W.

Averager 34, which follows the envelope detector, consists of a long time constant RC filter which functions to generate an output voltage which represents the average value of env R($t$). The effective time constant of the averaging circuit, $T_{RC}$, should extend over a large enough number of quaternary sequence code periods ($1/W$) to generate an effective average. A reasonable number would appear to be in the range of 10 to 50 code periods. This would normally be a very small percentage of an information bit duration.

The output of the averager circuit may be ideally represented by:

$$R'(t)=\frac{1}{T_{RC}}\int_{t-T_{RC}}^{t}\text{env }R(\tau)d(\tau) \quad (12)$$

The fluctuating components of env R($t$) (see Equation 10 and discussion thereof) tend to be self cancelling, so that to a first approximation:

$$R'(t)\approx\sqrt{A^2+B^2} \quad (13)$$

As the ratio $A/B$ becomes small, the average becomes an excellent estimation of the interfering signal amplitude B. Hence:

$$R'(t)=\overline{\text{env }R(t)}\approx B \text{ for } B\gg A \quad (14)$$

This approximation of B is the control voltage applied to the gain control input of variable gain amplifier 44.

The signal input for amplifier 44 is derived by passing R($t$) (see Equation 9) through ideal limiter 40 to remove all envelope fluctuations and keep the envelope at some constant amplitude K. The output of the limiter, therefore, is a rectangular wave stream which preserves the phase relationships of R($t$). This waveform is then passed through bandpass filter 42 to smooth the sharp transitions and thereby remove any spurious signals resulting from the clipping action of the limiter. The output of the filter may be expressed as:

$$\text{bandpass filter 42 output}=K\cos[\arg R(t)] \quad (15)$$

Since K is an arbitrarily selected constant value, the variable gain amplifier may be calibrated to multiply this input from the bandpass filter by a value $$\frac{\overline{\text{env }R(t)}}{K}\approx\frac{B}{K}$$

to produce a signal H($t$) which closely approximates the interfering signal waveform; that is:

$$H(t)=\frac{\overline{\text{env }R(t)}}{K}\cdot K\cos[\text{arg. }R(t)]$$
$$=\overline{\text{env }R(t)}\cdot\cos[\arg R(t)]$$
$$\approx B\cos[\arg R(t)]$$
$$\approx I(t) \quad (16)$$

By subtracting H($t$) from R($t$) in difference amplifier 38, the following output is obtained:

$$\begin{aligned} D(t) &= R(t) - H(t) \\ &= S(t) + I(t) - H(t) \\ &\approx S(t) \\ &\text{Since } I(t) - H(t) \approx 0 \end{aligned} \qquad (17)$$

A more detailed analysis of this output will be made hereinafter.

Figure 5:
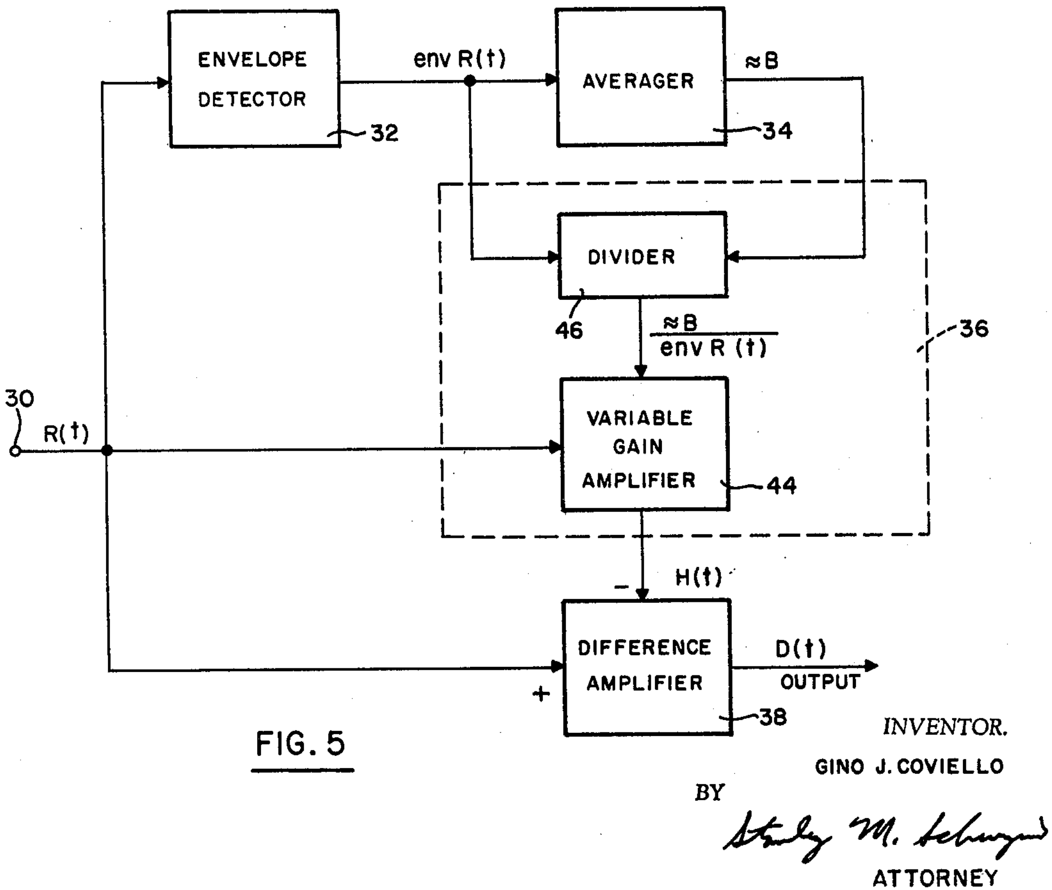
FIG. 5 is a block diagram of an alternate embodiment of a nonlinear processor in accordance with the invention.

The same results may be achieved by means of an alternate embodiment of the processor, shown in FIG. 5. The only change from FIG. 4 is that a different implementation is employed for the gain adjusting circuit 36; in this instance R($t$) is fed directly to the signal input of variable gain amplifier 44 and the gain control input is provided by the output from a divider 46. The divider has two inputs, one being coupled to the output of envelope detector 32 and the other being coupled to the output of averager 34.

The function of divider 46 is to form the quotient:

$$Q(t) = \frac{\overline{\text{env } R(t)}}{\text{env } R(t)} \approx \frac{B}{\text{env } R(t)} \qquad (18)$$

This quotient fluctuates with the variations in env R($t$) and will remain in the vicinity of unity, especially as the ratio $A/B$ decreases. This value is then used to control the gain amplifier 44 so as to produce the desired output:

$$\begin{aligned} H(t) &= R(t) \cdot Q(t) \\ &= [\text{env } R(t) \cos [\arg R(t)]] \left[ \frac{\overline{\text{env } R(t)}}{\text{env } R(t)} \right] \\ &\approx B \cos [\arg R(t)] \\ &\approx I(t) \end{aligned} \qquad (19)$$

Now to consider the difference amplifier output D($t$) in more detail:

$$\begin{aligned} D(t) &= R(t) - H(t) \\ &\approx [\text{env } R(t) - B] \cos [\arg R(t)] \end{aligned} \qquad (20)$$

Combining with Equation 10, the envelope of D($t$) may be expressed as:

$$\text{env } D(t) \approx B[1 + (A/B)^2 + 2(A/B) \cos [w_s - w_1)t + b\pi/2 + \theta - \phi(t)]]^{1/2} - B \qquad (21)$$

For the case where $B \gg A$, this reduces to:

$$\text{env } D(t) \approx A \cos [(w_s - w_1)t + b\pi/2 + \theta - \phi(t)] \qquad (22)$$

using the well-known approximation that $\sqrt{1+2E} \approx 1+E$ for $E \ll 1$, in this case E being $$A/B \cos [(w_s - w_1)t + b\pi/2 + \theta - \phi(t)]$$

In order to simplify further derivations, the following definitions are made:

$$\begin{aligned} \alpha_s(t) &= w_s t + b\pi/2 \\ \alpha_1(t) &= w_1 t + \phi(t) \end{aligned} \qquad (23)$$

As $A/B$ approaches zero, arg R($t$) approaches $\alpha_i(t)$ and Equation 20 becomes:

$$\begin{aligned} D(t) &\approx \text{env } D(t) \cos \alpha_1(t) \\ &\approx A \cos [\alpha_s(t) + \theta - \alpha_1(t)] \cos \alpha_1(t) \end{aligned} \qquad (24)$$

This equation points up an interesting facet of the nonlinear processor. Since $\theta$ is always equal to 0 or $\pi$, it can be shown that whenever $\alpha_s(t)$ and $\alpha_1(t)$ are in quadrature, the envelope of D($t$) goes to zero and the signal disappears. Due to the quaternary phase modulation of the desired signal and the fact that $\alpha_1(t)$ is not correlated with $\alpha(t)$, however, the presence of an output signal is assured for approximately half of the quaternary sequence code periods during an information bit. Thus, there exists only a 3 db net loss of signal power, while $S/I$ is greatly enhanced.

The effectiveness of the nonlinear processor can be quantitatively determined by use of a modified version of Equation 6, namely:

$$\text{Interference Suppression of Nonlinear Processor} = (S/I)_d - TW - (S/I)_a \qquad (25)$$

In experimental tests, an interference suppression of approximately 40 db has been achieved at an input $S/I$ ratio of −40 db. In fact, it has been observed experimentally that the interference suppression provided by the nonlinear processor is nearly equivalent to the input S/I ratio, increased suppression being provided as the interference becomes stronger. Hence, the processor tends to equalize the interfering and desired signal powers to provide an input to the correlator which is in the vicinity of 0 db. The correlator then provides a further improvement in $S/I$ which to a first approximation is equivalent to the TW product. Thus with $TW$=30 db, for example, a spread spectrum receiver without the processor would provide an $S/I$ at the detector of approximately −10 db for an input $S/I$ ratio of −40 db; with the nonlinear processor connected ahead of the correlator, however, the interference suppression would be improved by an added 40 db. to provide an S/I ratio at the detector of approximately +30 db.

It is apparent, however, that since the nonlinear processor tends to cancel out the strong signal, its effect would be detrimental whenever the interfering signal is actually weaker than the desired signal. Consequently, a decision and control circuit is required in the receiver to switch the processor either in or out of the circuit as needed. One approach toward providing bypass control is to "measure" the input $S/I$ ratio (at the antenna) and trigger a switch at the correlator input when a preselected decibel level is crossed. A second approach is to employ a second correlation channel identical to the first, but without a nonlinear processor, and to compare the outputs of the channels to determine which has the greatest proportion of signal energy. This signal comparison can then be used to trigger a switch to select that channel as the information output.

Figures 6, 7, 8:
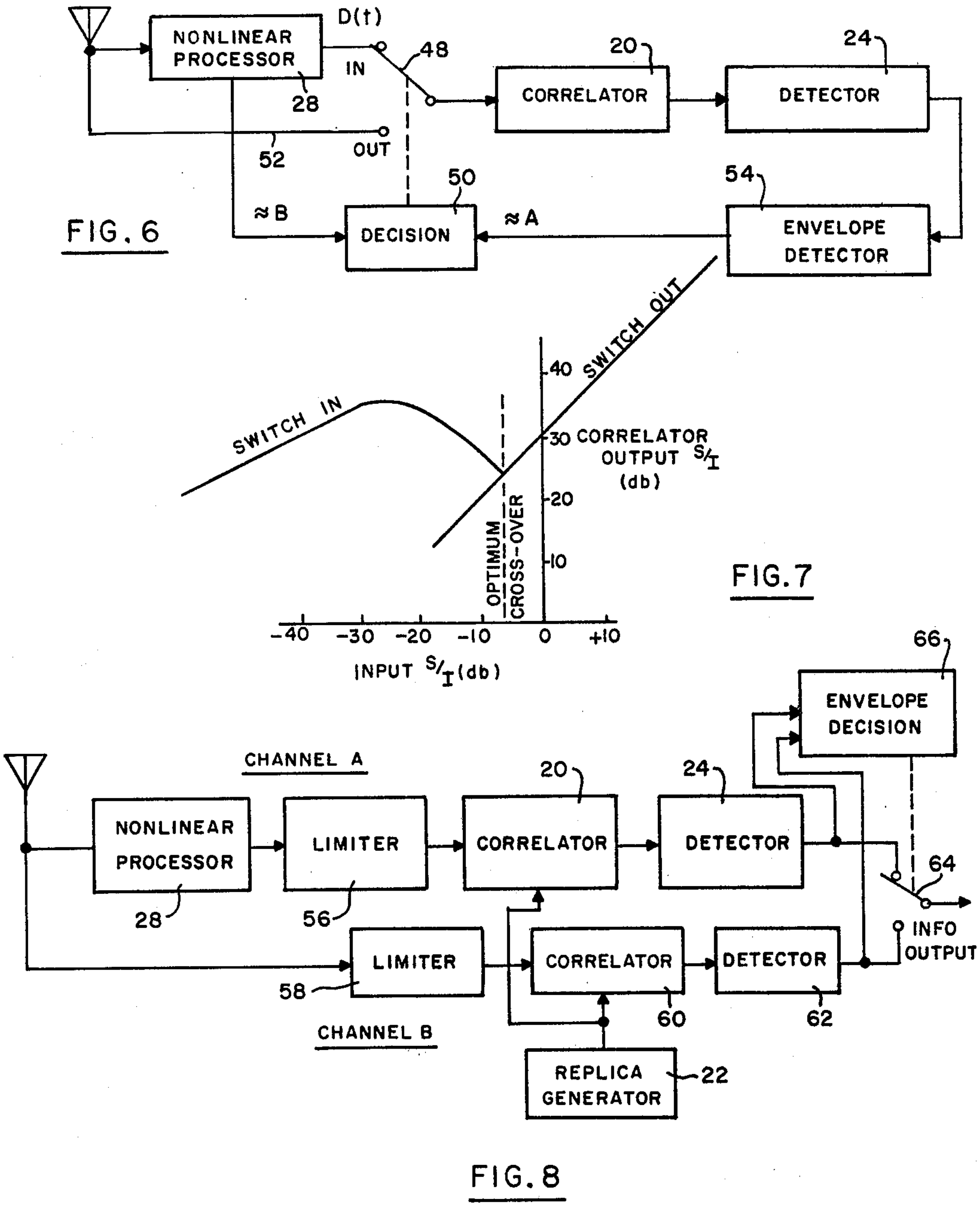
FIG. 6 is a block diagram of a bypass control arrangement useful in the receiver of FIG. 2.
FIG. 7 is a graph of output $S/I$ vs. input $S/I$ for two modes of performance of the FIG. 6 circuit; and, FIG. 8 is a block diagram of another bypass control arrangement useful in the receiver of FIG. 2.

An implementation of the first bypass control approach is shown in FIG. 6. A two-position switch 48 is connected at the input of correlator 20 and adapted to be controlled by a decision circuit 50 so that in one position the switch connects the correlator input to the output of nonlinear processor 28, while in the second position the switch causes the processor to be bypassed via circuit path 52. Decision circuit 50 has two inputs, the output of averager 34 in the nonlinear processor being connected to one input, and the output of detector 24 being connected through an envelope detector 54 to the other decision input. The averager provides an estimate of B, the amplitude of the interfering signal, while the output of detector 54 provides an estimate of A, the amplitude of the desired signal, circuit 50 being calibrated to account for any fixed gain factors introduced in the signal processing prior to detector 54.

The decision circuit operates to compare these two voltages and thereby provide an approximate measure of the input $S/I$ ratio. If the ratio $\approx A/\approx B$ is below a preselected threshold level, circuit 50 will control the switch to connect the correlator input to the nonlinear processor. If the ratio increases enough to cross this threshold level, the decision circuit will cause the processor to be switched out of the circuit and be bypassed. Finally, if the ratio crosses the threshold level in a decreasing manner, the processor will once again be switched into the circuit. To accomplish these functions, the decision circuit may comprise, for example, a voltage divider and difference amplifier, and the switch may be a flip-flop controlled by the difference amplifier plus and minus outputs. If the threshold level was to be say −6 db., a divide-by-two circuit would be used at the ≈B input of the difference amplifier, while ≈A would be applied directly to the other difference amplifier input. If $\approx A > \approx B/2$, indicating that $\approx A/\approx B > -6$ db., a plus output would be produced by the difference amplifier to switch out the processor. If $\approx B/2 > \approx A$, indicating $\approx A/\approx B < -6$ db., then a minus output would result to switch the processor back in the circuit.

Selection of the appropriate threshold level may best be illustrated by an example. FIG. 7 shows performance curves for two modes of operation of an experimental embodiment of the FIG. 6 arrangement in which a TW product of 1000, or 30 db was employed. The correlator 20 output *S/I* ratios over a wide range of input *S/I* ratios (at the antenna) are indicated both for the case where the nonlinear processor is in the circuit and where it is switched out. It will be noted that with the nonlinear processor bypassed (switch out condition), the receiver operates as a conventional spread spectrum system, and the *S/I* ratio at the correlator output increases with an increase in the *S/I* ratio at the antenna. With the processor connected in the circuit, however, the correlator output *S/I* decreases as the input *S/I* ratio increases above −20 db. FIG. 7 shows that the crossover point of these two curves is the optimum switching point since a minimum of 24 db output ratio is assured whether the processor is in or out. Hence, the desired threshold level is the corresponding input *S/I*, namely −6 db. This decision level need not be critical, for it will be noted that if the tolerance of switching were set at any level from −6 db to −10 db, the worst output *S/I* would be at least 20 db.

A preferred embodiment of the second bypass control method mentioned above is illustrated by the block diagram of FIG. 8. Correlation channel A includes nonlinear processor 28, correlator 20 and detector 24, but in this instance a limiter 56 is inserted between the processor and correlator. The second parallel correlation channel, denoted as channel B, is identical to channel A except that it operates directly on the received input signal without the benefit of a nonlinear processor. More specifically, channel B comprises a limiter 58, correlator 60 and detector 62 serially connected in that order between the composite received signal input and the information output. The output of replica generator 22 is applied in parallel to both correlators. Limiters 56 and 58 are both set to approximately equal clipping levels.

An output switch 64 is adapted to be controlled by an envelope decision circuit 66 so that in one position detector 24 is connected to provide the information output, while in the second position detector 62 provides the output to the remainder of the receiver circuitry. Decision circuit 66 is arranged to compare the two detector output envelopes and control switch 64 to select the higher amplitude channel for reception. Hence, circuit 66 may comprise a pair of envelope detectors, each connected to a respective detector output, and a difference amplifier having a pair of inputs respectively connected to the envelope detectors. As with decision circuit 50, the difference amplifier in circuit 66 would provide plus and minus outputs to switch 64, which may comprise a flip-flop.

The theory of operation of FIG. 8 is as follows. When the input *S/I* ratio is less than 0 db, the nonlinear processor is effective, and the signal in channel A is predominantly composed of the desired signal, while the B channel contains primarily interference. When the *S/I* ratio exceeds 0 db, the nonlinear processor tends to cancel the signal and the reverse condition occurs. Limiters 56 and 58, however, maintain a constant input power level to the correlators. Now it is well-known that the output of a correlation channel detector builds up linearly with a correlated signal (the desired signal), but only as the square root of the input for uncorrelated signals (interference). Hence, when the composite received signal consists of a strong desired signal and a weaker interfering signal, the output of limiter 58 will contain more signal energy than the output of limiter 56, and a channel B will build up to a higher amplitude level than channel A. Upon comparison of the detector output envelopes for this condition, decision circuit 66 will control switch 64 to tap the output of channel B.

If the input to the receiver consists of a stronger interfering signal than desired signal, a complementary situation arises. Channel B consists primarily of uncorrelated interference and hence builds up to a low envelope signal. In channel A, the nonlinear processor cancels the interfering signal and results in a higher amplitude output envelope from detector 24. Hence, channel A will be selected as the information output.

Although the invention has been described in its preferred embodiment as comprising the use of a nonlinear processor in combination with a quaternary phased spread spectrum signal to achieve interference suppression, the described nonlinear processor may also be effectively employed in a binary phased spread spectrum system or a conventional radio receiver. If the spread spectrum modulation were binary instead of quaternary, the loss in signal power, due to nonlinear processing, would still be only 3 db over a long averaging time. However, there could be periods of time extending over several information bits in which the interfering signal and the desired signal remain in quadrature. As previously noted, complete signal loss would occur during these bits. Quaternary spread spectrum modulation, on the other hand, prevents the loss of complete bits, as discussed above following Equation 24.

In the case of a conventional radio receiver, without spread spectrum modulation, $b=0$. Hence, if $w_s=w_i$ and $\phi(t)$ is a constant, Equation 24 reduces to:

$$D(t) \approx A \cos(\theta-\phi)\cos \alpha_i(t) \quad (26)$$

Here again there could be periods extending over several information bits in which $\theta$ and $\phi$ remain in quadrature to result in a complete signal loss during such periods.

While particular embodiments of the invention have been illustrated, it is to be understood that the applicant does not wish to be limited thereto, since modifications will now be suggested to those skilled in the art. Applicant, therefore, contemplates by the appended claims to cover all such modifications as fall within the true spirit and scope of his invention.

What is claimed is:

1. In a radio receiver, a nonlinear processing circuit for suppressing strong interfering signals in favor of a desired signal which comprises, means for deriving from a composite received signal consisting of the desired signal and a stronger interfering signal a control voltage which approximates the amplitude of said interfering signal, means for adjusting the amplitude of said composite received signal in response to said control voltage to generate a waveform which approximates said interfering signal waveform, and means for subtracting said approximation of the interfering signal waveform from said composite received signal.

2. A receiver in accordance with claim 1 wherein said means for deriving a control voltage from the composite received signal comprises an envelope detector, means for applying said composite received signal to the input of said envelope detector, and an averager having an input coupled to the output of said envelope detector and an output from which said control voltage is available.

3. A receiver in accordance with claim 2 wherein said subtraction means comprises a difference amplifier having two inputs to which said approximation of the interfering signal waveform and said composite received signal are respectively applied and an output from which said desired signal is available with the interfering signal substantially suppressed.

4. A receiver in accordance with claim 3 wherein said means for adjusting the amplitude of said composite received signal comprises an ideal limiter, means for applying said composite received signal to the input of said limiter, a variable gain amplifier having a signal input, a gain control input coupled to the output of said averager and an output coupled to an input of said difference amplifier, and a bandpass filter connected between the output of said limiter and the signal input of said variable gain amplifier, said approximation of the interfering signal being available at the output of said variable gain amplifier.

5. A receiver in accordance with claim 3 wherein said means for adjusting the amplitude of said composite received signal comprises a divider having a first input coupled to the output of said envelope detector and a second input coupled to the output of said averager, a variable gain amplifier having a signal input, a gain control input coupled to the output of said divider and an output coupled to an input of said difference amplifier, and means for applying said composite received signal to the signal input of said variable gain amplifier, said approximation of the interfering signal waveform being available at the output of said variable gain amplifier.

6. A receiver in accordance with claim 3 wherein said desired signal is a spread spectrum signal, and further including a correlator for recovering narrow band information from said spread spectrum signal, the input of said correlator being coupled to the output of said difference amplifier.

7. A receiver in accordance with claim 6 wherein said desired signal is a quaternary phased spread spectrum signal.

8. In a radio communication system including a transmitter and receiver, means for suppressing strong interfering signals in said receiver in favor of the desired signal transmitted by said transmitter which comprises, modulation means in said transmitter for producing a spread spectrum signal, a correlator in said receiver for recovering narrow band information from said spread spectrum signal, and a nonlinear processing circuit connected ahead of said correlator in said receiver and comprising means for deriving from a composite received signal consisting of said desired spread spectrum signal and a stronger interfering signal a control voltage which approximates the amplitude of said interfering signal, means for adjusting the amplitude of said composite received signal in response to said control voltage to generate a waveform which approximates said interfering signal waveform, and means for subtracting said approximation of the interfering signal waveform from said composite received signal, the output of said subtraction means being coupled to the input of said correlator.

9. A communication system according to claim 8 wherein said means for deriving a control voltage from the composite received signal comprises an envelope detector, means for applying said composite received signal to the input of said envelope detector and an averager coupled to the output of said envelope detector for generating said control voltage, and wherein said subtraction means comprises a difference amplifier having two inputs to which said approximation of the interfering signal waveform and said composite received signal are respectively applied and an output coupled to the input of said correlator, said difference amplifier being operative to produce said desired spread spectrum signal with the interfering signal substantially suppressed.

10. A communication system according to claim 9 wherein said means for adjusting the amplitude of said composite received signal comprises an ideal limiter, means for applying said composite received signal to the input of said limiter, a variable gain amplifier having a signal input, a gain control input coupled to the output of said averager and an output coupled to an input of said difference amplifier, and a bandpass filter connected between the output of said limiter and the signal input of said variable gain amplifier, said approximation of the interfering signal being available at the output of said variable gain amplifier.

11. A communication system according to claim 10 wherein said modulation means in the transmitter includes a four-phase modulator and is operative to produce a quaternary phased spread spectrum signal.

12. A communication system according to claim 9 wherein said means for adjusting the amplitude of said composite received signal comprises a divider having a first input coupled to the output of said envelope detector and a second input coupled to the output of said averager, a variable gain amplifier having a signal input, a gain control input coupled to the output of said divider and an output coupled to an input of said difference amplifier, and means for applying said composite received signal to the signal input of said variable gain amplifier, said approximation of the interfering signal waveform being available at the output of said variable gain amplifier.

13. A communication system according to claim 12 wherein said modulation means in the transmitter includes a four-phase modulator and is operative to produce a quaternary phased spread spectrum signal.

14. A communication system according to claim 9 further including a decision and control means in said receiver for bypassing said nonlinear processing circuit when said desired signal is stronger than said interfering signal.

15. A communication system according to claim 14 further including an integrating detector connected at the output of said correlator for providing an information output signal, and wherein said decision and control means comprises; a two-position switch connected at the input of said correlator and adapted to be controlled by signals applied thereto so that in one position said switch connects said correlator input to the output of said nonlinear processing circuit and in the second position said switch connects the input of said correlator to the common composite received signal input of said envelope detector, amplitude adjusting means and difference amplifier to thus bypass said nonlinear processing circuit; a decision circuit having first and second inputs; means connecting the output of said averager to the first input of said decision circuit; means coupled between the output of said integrating detector and the second input of said decision circuit for applying an estimate of the amplitude of said desired signal to that input, said decision circuit beng operative to compare the signals applied to its first and second inputs and produce output signals representative of the ratio of said second decision input signal to said first decision input signal; and, means for applying said decision circuit output signals to control said switch.

16. A communication system according to claim 14 further including a first integrating detector connected at the output of said correlator for providing a first information output signal, wherein said correlator is a first correlator in said receiver, and wherein said decision and control means comprises: a first limiter connected between said nonlinear processing circuit and said first correlator, said nonlinear processing circuit, first limiter, first correlator and first integrating detector comprising a first receiver channel; a second receiver channel including a second limiter, second correlator and second integrating detector serially connected in that order with the composite received signal being applied to the input of said second limiter and said second integrating detector providing a second information output signal; a two-position switch connected at the output of said first and second integrating detectors and adapted to be controlled by signals applied thereto so that in one position said switch connects the output of said first integrating detector to provide the information output signal to the remainder of the receiver circuitry and in the second position said switch connects the output of said second integrating detector to provide the information output signal to the receiver; a decision circuit having first and second inputs coupled to the outputs of said first and second integrating detectors, respectively, and operative to compare the envelopes of the two integrating detector output signals and produce output signals representative of which of the compared signal envelopes has the higher amplitude; and, means for applying said decision circuit output signals to control said switch.

References Cited

UNITED STATES PATENTS 3,387,222 6/1968 Hellwarth et al. -- 325—474 X

ROBERT L. GRIFFIN, Primary Examiner

WILLIAM S. FROMMER, Assistant Examiner

U.S. Cl. X.R.

325—474